United States Patent
Imai (10) Patent No.: US 9,230,462 B2
(45) Date of Patent: Jan. 5, 2016

(54) IMAGE DISPLAY DEVICE

(75) Inventor: Hiroshi Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 952 days.

(21) Appl. No.: 12/529,386

(22) PCT Filed: Mar. 5, 2008

(86) PCT No.: PCT/JP2008/053916
§ 371 (c)(1),
(2), (4) Date: Sep. 1, 2009

(87) PCT Pub. No.: WO2008/108389
PCT Pub. Date: Sep. 12, 2008

(65) Prior Publication Data
US 2010/0026791 A1   Feb. 4, 2010

(30) Foreign Application Priority Data
Mar. 7, 2007   (JP) .................................. 2007-057898

(51) Int. Cl.
| | | |
|---|---|---|
| *G02F 1/1335* | (2006.01) | |
| *G02F 1/1337* | (2006.01) | |
| *G09F 19/16* | (2006.01) | |
| *G02B 27/26* | (2006.01) | |
| *G03B 35/18* | (2006.01) | |
| *H04N 13/04* | (2006.01) | |

(52) U.S. Cl.
CPC ................ *G09F 19/16* (2013.01); *G02B 27/26* (2013.01); *G03B 35/18* (2013.01); *H04N 13/049* (2013.01); *G02F 1/133555* (2013.01); *G02F 2001/133541* (2013.01); *G02F 2201/50* (2013.01); *H04N 13/0434* (2013.01)

(58) Field of Classification Search
None
See application file for complete search history.

(56) References Cited

U.S. PATENT DOCUMENTS

| | | | | |
|---|---|---|---|---|
| 5,469,279 | A | * 11/1995 | Sharp et al. | ...................... 349/74 |
| 5,835,166 | A | * 11/1998 | Hall et al. | ........................ 349/15 |
| 6,075,651 | A | * 6/2000 | Hoppe | ........................... 359/641 |
| 6,335,999 | B1 | * 1/2002 | Winston et al. | ............... 385/146 |
| 6,359,712 | B1 | * 3/2002 | Kamitani | ........................ 398/41 |
| 6,389,236 | B1 | 5/2002 | Western | |
| 6,437,904 | B1 | * 8/2002 | Reeder | ........................... 359/322 |

(Continued)

FOREIGN PATENT DOCUMENTS

| | | |
|---|---|---|
| JP | 2006276100 A | 10/2006 |
| JP | 2006276101 A | 10/2006 |
| WO | 2005119376 A | 12/2005 |

OTHER PUBLICATIONS

Takanori Okoshi, "Three Dimensional Image Engineering", Asakura Publishing Co. Ltd., Jul. 10, 1991, pp. 10-21.

*Primary Examiner* — Ario Etienne
*Assistant Examiner* — Ho Shiu (57) ABSTRACT

To provide an image display device in which reflection of an image on one display surface onto another display surface is suppressed. In an image display device where an image is displayed on a screen combining the display surfaces of two or more image display elements, a polarizing plate is arranged on the display surface on conditions that extinction takes place between the display surfaces of the image display elements. The extinction conditions are set such that the light entering from a display surface to which the polarizing plate is fixed is passed through and the light entering from other than the above display surface is absorbed by intersecting the polarization directions of the polarizing plates perpendicularly.

7 Claims, 9 Drawing Sheets

(56) References Cited

U.S. PATENT DOCUMENTS

| | | | |
|---|---|---|---|
| 6,504,589 B1* | 1/2003 | Kashima et al. | 349/96 |
| 6,992,809 B1* | 1/2006 | Wang et al. | 359/279 |
| 7,607,779 B2* | 10/2009 | Sonehara | 353/7 |
| 2002/0001135 A1* | 1/2002 | Berman et al. | 359/640 |
| 2003/0053033 A1* | 3/2003 | Vrachan et al. | 353/31 |
| 2003/0067641 A1* | 4/2003 | Wein et al. | 359/110 |
| 2003/0095228 A1* | 5/2003 | Hiji et al. | 349/177 |
| 2003/0095400 A1* | 5/2003 | Kashima et al. | 362/31 |
| 2003/0108284 A1* | 6/2003 | Danagher et al. | 385/24 |
| 2003/0156088 A1* | 8/2003 | Maeda et al. | 345/96 |
| 2004/0114232 A1* | 6/2004 | Sekizawa et al. | 359/462 |
| 2004/0212885 A1* | 10/2004 | Mizushima et al. | 359/497 |
| 2004/0233360 A1* | 11/2004 | Yoshida et al. | 349/114 |
| 2004/0239641 A1* | 12/2004 | Takahata et al. | 345/173 |
| 2005/0140863 A1* | 6/2005 | Ha | 349/113 |
| 2005/0156813 A1* | 7/2005 | Adachi et al. | 345/1.3 |
| 2005/0243253 A1* | 11/2005 | Imai et al. | 349/122 |
| 2006/0007537 A1* | 1/2006 | Sedlmayr | 359/485 |
| 2006/0007539 A1* | 1/2006 | Mihalakis | 359/495 |
| 2006/0038946 A1* | 2/2006 | Yoshida et al. | 349/114 |
| 2006/0214875 A1* | 9/2006 | Sonehara | 345/8 |
| 2006/0232719 A1* | 10/2006 | Abileah | 349/15 |
| 2006/0238685 A1* | 10/2006 | Shibasaki et al. | 349/119 |
| 2006/0256288 A1* | 11/2006 | De Vaan | 353/20 |
| 2006/0268407 A1* | 11/2006 | Fergason et al. | 359/487 |
| 2006/0274329 A1* | 12/2006 | Kawano et al. | 356/601 |
| 2007/0013818 A1* | 1/2007 | Trapani et al. | 349/1 |
| 2007/0019163 A1* | 1/2007 | Ikeda et al. | 353/20 |
| 2007/0036512 A1* | 2/2007 | Winston et al. | 385/147 |
| 2007/0040905 A1* | 2/2007 | Vesely et al. | 348/58 |
| 2007/0064310 A1* | 3/2007 | Mukawa et al. | 359/630 |
| 2007/0091450 A1* | 4/2007 | Detro et al. | 359/640 |
| 2007/0147066 A1* | 6/2007 | Boyd et al. | 362/600 |
| 2007/0165305 A1* | 7/2007 | Mehrle | 359/464 |
| 2007/0166045 A1* | 7/2007 | Wang | 398/152 |
| 2007/0206282 A1* | 9/2007 | Miyatake et al. | 359/490 |
| 2007/0236629 A1* | 10/2007 | Wu et al. | 349/96 |
| 2008/0007813 A1* | 1/2008 | Wang et al. | 359/245 |
| 2009/0086317 A1* | 4/2009 | Etori | 359/449 |
| 2009/0257005 A1* | 10/2009 | Kamee et al. | 349/98 |
| 2010/0020045 A1* | 1/2010 | Walsh et al. | 345/176 |

* cited by examiner

IMAGE DISPLAY DEVICE

This application is the National Phase of PCT/JP2008/053916, filed Mar. 5, 2008, which is based upon and claims priority from Japanese Patent Application No. 2007-57898, filed on Mar. 7, 2007, the contents of which are incorporated by reference herein in their entirety.

TECHNICAL FIELD

The present invention relates to an image display device having a plurality of image display elements, and each display surface of the image display elements is directed to an observer to display an image thereon.

BACKGROUND ART

In recent years, a stereoscopic display device, which achieves stereo vision by spatially separating a plurality of images with binocular parallax into right and left eyes respectively, by using a lenticular lens, a parallax barrier and the like, is focused on as a stereoscopic display device using a flat-panel display such as a liquid crystal panel. This kind of stereoscopic display device is advantageous in that special glasses are not necessary therefor (for example, Non-patent Document 1).

Figure 7:
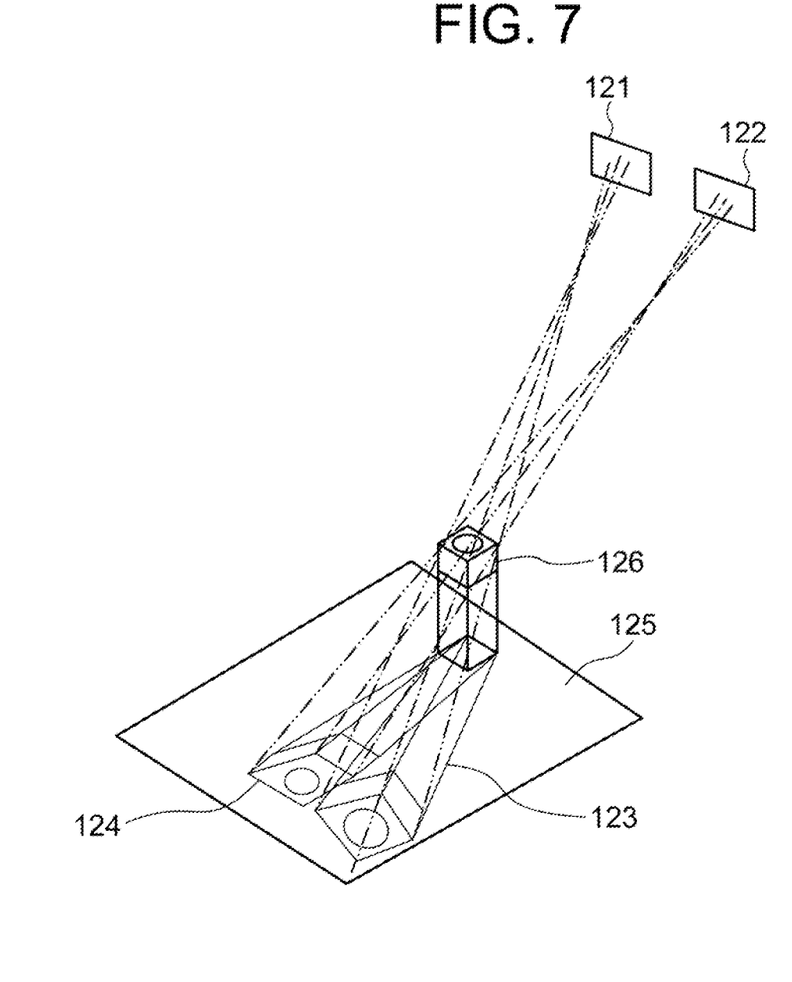
FIG. 7 a diagram explaining a way to generate a stereoscopic image according to a related art.

To generate a stereoscopic image for enhancing effect of the stereoscopic vision, there is disclosed a method of displaying the stereoscopic image by transforming an image, using a perspective projection, toward an oblique direction with respect to a visual axis (Patent Document 1). FIG. 7 is a diagram for explaining a method to generate a stereoscopic image. In the method for generating a stereoscopic image shown in FIG. 7, images corresponding to respective viewpoints of right eye 121 and left eye 122 are transformed by the perspective projection into a right eye perspective projection transformation image 123 and a left eye perspective projection transformation image 124 to be projected on the imago display surface 125. In that case, the right eye perspective projection transformation image 123 and the left eye perspective projection transformation image 124 are projected, in the oblique direction with respect to the view axis, on the image display surface 125. When the stereoscopic display is performed using the above method, an observer perceives a stereoscopic image 126. At this time, each part of the projected image of the stereoscopic image 126 has different distance from an observing point of the observer in the image display surface 125, therefore the observer do not become conscious of the image display surface. It is effective to reduce eye strain of the observer caused by binocular stereo vision. In addition, a wide angle of view, which can be obtained by the above method, further enhances effect of the stereoscopic vision. As a result, a more realistic stereoscopic image can be provided.

Figure 8:
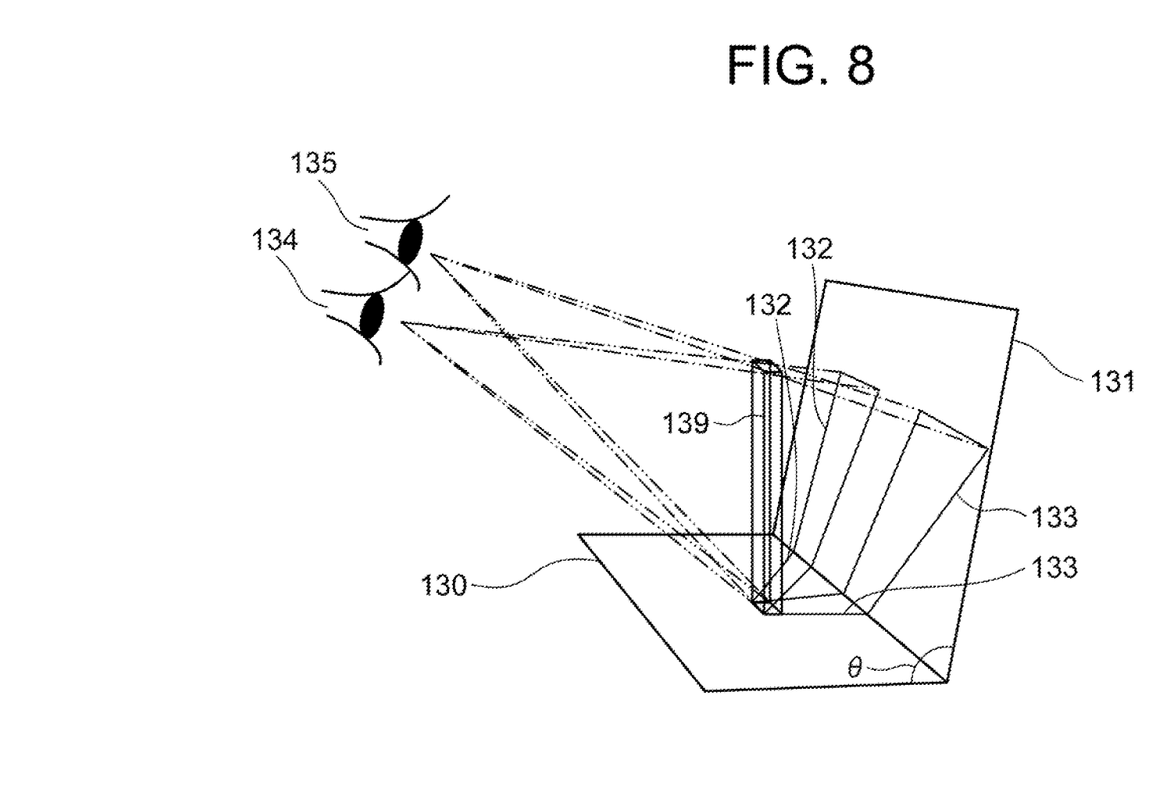
FIG. 8 a diagram explaining a stereoscopic display device having a combination of two or more image display elements.

FIG. 8 is a diagram illustrating a stereoscopic display device in which two or more image display elements are connected. In order to provide a stereoscopic display device having a wider angle of view by using image display elements 130 and 131, two or more image display elements 130 and 131 need to be connected so that the angle α between the image display elements 130 and 131 becomes more than 90 degrees and less than 180 degrees. The stereoscopic image display elements 130 and 131 display a right eye perspective projection transformation image 132 and a left eye perspective projection transformation imago 133 thereon, where the images are observed by an observer with his/her right eye 134 and left eye 135 at these respective viewpoints. As a result, the observer can observe a stereoscopic image 139 at wide angle of view, which leads to observation of a realistic stereoscopic image.

Non-patent Document 1: pp 11-21, "three dimensional image engineering" by Takanori Okoshi published by Asakura Publishing, Co. Ltd.

Patent Document 1: U.S. Pat. No. 6,389,236

DISCLOSURE OF THE INVENTION

Problems to be Solved by the Invention

However, in the image display device in which two or more image display elements are connected to each other, there is a problem that light beams emitted from the display surface of one image display element is reflected on the display surface of the other image display element. Hereinafter, an image of one display surface which is reflected on the other display surface is defined as "a reflection image".

Figure 9A:
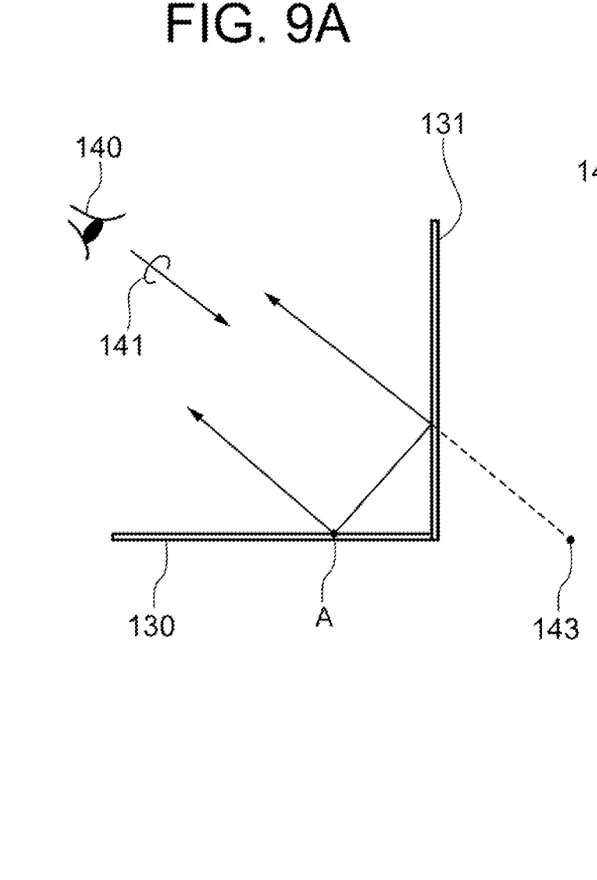
FIG. 9 a diagram explaining light reflection from a display surface.
Figure 9B:
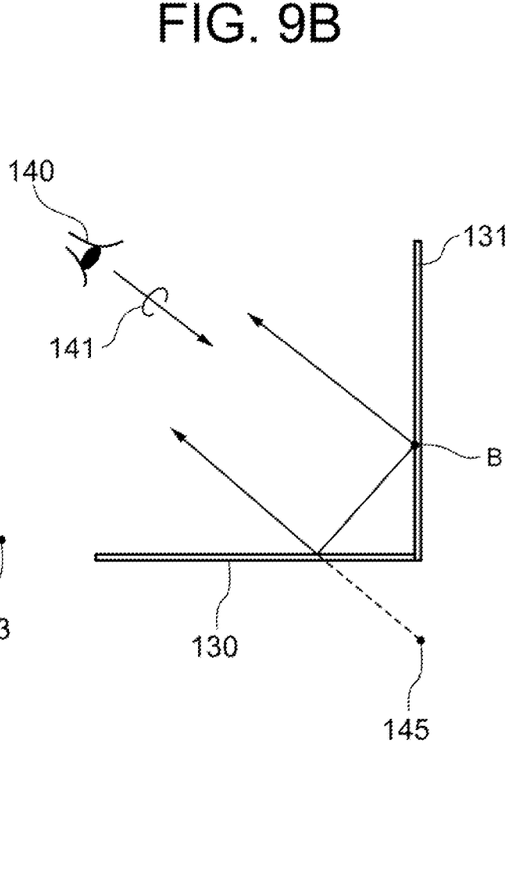

FIG. 9 is a diagram for explaining light reflection from a display surface. In FIG. 9[A], light beams that are emitted from a pixel A on the stereoscopic image element 130 and traveling in an observing direction 141 include a light beam reflected from a surface of the stereoscopic image element 131, other than a light beam directly traveling from the pixel A. Due to this light beam, a reflection image 143 of the element A is observed by an observer 140. In the same manner, in FIG. 9[B], light beams that are emitted from a pixel B on the stereoscopic image element 131 and traveling in an observing direction 141 include a light beam reflected from the stereoscopic image element 130. Due to this light beam, a reflection image 145 of the element B is observed by the observer 140.

As described above, the reflection images caused by a reflected light beam emitted from one display surface and reflected on the other display surface accounts for a problem of visibility degradation, and also for the following problem. When an observer recognizes a stereoscopic image, a false stereoscopic image generated by the reflection images on both display surfaces is observed at the same time. That brings discomfort to the observer. Further, even if the display surfaces is simply processed with anti-glare processing for antireflection, scattering light beams caused by the anti-glare processing are reflected diffusely from both the display surfaces, and thereby visibility for the display image degrades.

Therefore, an object of the present invention is to provide an image display device which is capable of preventing an image of one display surface from reflecting on the other display surface.

Means for Solving the Problems

To achieve the above mentioned object, the image display device according to the present invention for displaying an image on a screen which is a combination of display surfaces of two or more image display-elements comprises:

a polarizing plate arranged on the display surface on condition that extinction takes place between the display surfaces of the image display elements.

The extinction conditions are set such that light entering from the display surface having the polarizing plate attached thereon is transmitted, and light entering from other than the display surface is absorbed, by intersecting polarizing directions of the polarizing plates perpendicularly.

Advantageous Effect of the Invention

According to the present invention, the polarizing plates arranged on the display surfaces of the image display elements suppress the generation of the reflection image on each display surface, and thereby an observer can be provided with a significantly realistic stereoscopic image not having uncomfortable feeling.

BEST MODE FOR CARRYING OUT THE INVENTION

Hereinafter, exemplary embodiments of the invention will be explained with reference to drawings.

The exemplary embodiment of the invention is targeting for an image display device in which two or more image display elements (1, 2) are combined so as to display an image. The exemplary embodiment will be concretely explained taking a case with a combination of the image display elements 1 and 2 as an example. Two image display elements 1 and 2 shown in FIG. 1 display images on the display surfaces 1a and 2a for a viewpoint 13. Hereinafter, a case will be explained as an example in which a parallax image for the viewpoint 13 is spatially separated to be displayed on the display surfaces 1a and 2a. In this case, "a parallax image for the viewpoint 13 is spatially separated to be displayed" means that image is separated into images for observer's right eye and left eye to be displayed on the display surfaces 1a and 2a of the image display elements 1 and 2 respectively, when a point 13 is a viewpoint of the observer. Specifically, when the display surface of the horizontal image display element 1 is an X axis display surface 1a and the display surface of the vertical image display element 2 is a Y axis display surface 2a in FIG. 1, the parallax images for the viewpoint 13 are spatially separated. That is, the parallax image is separated into the images for left eye and for left eye to be displayed from the X axis display surface 1a to the Y axis display surface 2a.

Figure 1:
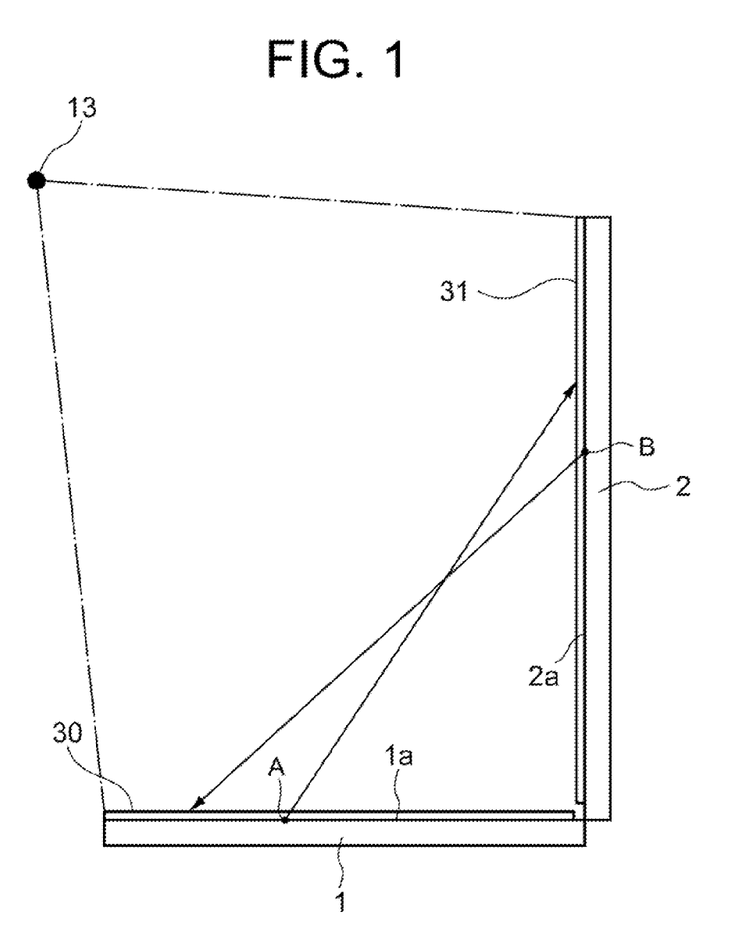
FIG. 1 A configuration diagram showing a basic exemplary embodiment of the invention.

When the observer observes the image displayed on the X-axis display surface 1a and the Y-axis display surface 2a with both eyes fixed on the viewpoint 13, the observer observes the right eye image displayed on the X-axis display surface 1a and the Y-axis display surface 2a with the right eye, and observes the left eye image displayed on the X-axis display surface 1a and the Y-axis display surface 2a with the left eye. Therefore, the right eye image and the left eye image displayed on the X-axis display surface 1a and the Y-axis display surface 2a are synthesized, and the observer observes it as one image. In this case, by providing an optical system for stereoscopically displaying such as a lenticular lens, a parallax barrier, a lens array or a pinhole array for integral photography, on the X-axis display surface 1a and the Y-axis display surface 2a, it becomes possible to stereoscopically display the image. Further, in the case of not using the optical system for stereoscopically displaying, the image can be displayed as a two-dimensional image.

As shown in FIG. 1, the image display device according to the exemplary embodiment of the invention is characterized in that polarizing plates 30 and 31 are arranged on the display surfaces (1a, 2a) on condition that extinction takes place between the display surfaces (1a, 2a) of the image display elements (1, 2), as a fundamental structure. In the aforementioned, one image display element 1 or 2 is to output a horizontal polarization which is a horizontal component of a linear polarization, and the other image display element 2 or 1 is to output a vertical polarization which is a vertical component of the linear polarization.

The extinction condition is set such that light entering from the display surface 1a (or 2a) on which the polarizing plate 30 (or 31) is attached is transmitted and light entering from other than the display surface 1a (or 2a) is absorbed by intersecting the polarizing directions of the polarizing plates 30 and 31 perpendicularly.

According to the exemplary embodiment of the invention, the polarizing plates 30 and 31 are arranged on the display surfaces 1a and 2a of the image display elements 1 and 2 respectively, and the polarizing directions of the polarizing plates 30 and 31 are orthogonal to each other. Therefore, a light beam directed from one display surface 1a (or 2a) to the other display surface 2a (or 1a) is intercepted by the polarizing plate 31 (or 30).

Thus, according to the exemplary embodiment of the invention, the polarizing plates arranged on the display surfaces of the image display elements can suppress reflection of images among the display surfaces, and specifically, when a stereoscopic image is displayed, the observer can be provided with an excellently realistic stereoscopic image without having uncomfortable feeling.

In the above mentioned exemplary embodiment of the invention, the polarizing plates are arranged on the display surfaces of the image display elements basically to suppress reflection of images among the display surfaces. Additionally, another example will be described with reference to FIG. 2 as a first exemplary embodiment, which is a measure against a reflection caused by a light beam entering from other than the display surfaces.

Figure 2:
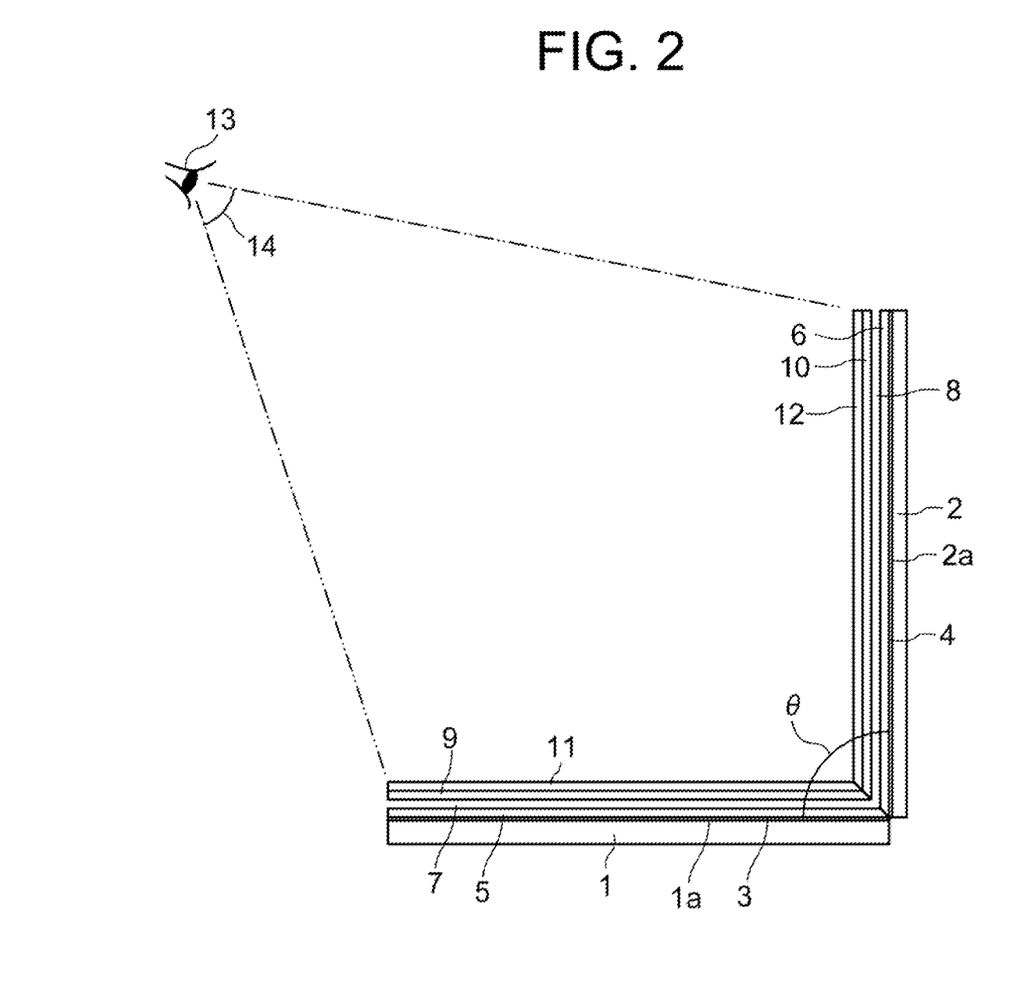
FIG. 2 a configuration diagram showing an image display device according to a first exemplary embodiment of the invention.

As shown in FIG. 2, in the first exemplary embodiment of the invention, polarizing plates 3 and 4 are arranged on display surfaces 1a and 2a of two image display elements 1, and 2 respectively. In addition, first quarter wavelength plates 5 and 6, hollow layers 7 and 8, second quarter wavelength plates 9 and 10, and polarizing plates 11 and 12 are arranged on the polarizing plates 3 and 4. The first quarter wavelength plate 5, the hollow layer 7, the second quarter wavelength plate 9, and the polarizing plate 11 in FIG. 2 correspond to the polarizing plate 30 in FIG. 1, and the first quarter wavelength plate 6, the hollow layer 8, the second quarter wavelength plate 10, and the polarizing plate 12 in FIG. 2 correspond to the polarizing plate 31 in FIG. 1.

The first quarter wavelength plates 5 and 6 in the above are for converting a linear polarization into a circular polarization, and the second quarter wavelength plates 9 and 10 in the above are for converting a circular polarization into a linear polarization. The hollow layers 7 and 8 are formed when a protrusion such as a spacer (unillustrated) is provided between the quarter wavelength plates 5, 6 and 9, 10. The hollow layers 7 and 8 are to maintain an interval between the first quarter wavelength plates 5, 6 and the second quarter wavelength plates 9, 10 so that direction of the circular polarization inverts therein. The polarizing plates 11 and 12 combined with the second quarter wavelength plates 9 and 10 are arranged so that polarization directions of the polarizing plates are orthogonal to each other. The polarizing plates 11 and 12 are processed with an anti-glare processing.

The display surfaces 1a and 2a are rectangle, and contact each other at one side. They are arranged in an elevating direction, that is, in a vertical direction. The display surfaces 1a and 2a of those two image display elements 1 and 2 contact each other at each one side, and thereby the combination of these two display surfaces 1a and 2a forms a screen to display an image. The display surfaces 1a and 2a contact each other at each one side, which means that the display surfaces 1a and 2a are in the closest condition with each other. When the display surfaces 1a and 2a become closer, a stereoscopic angle to view from one surface to the other becomes wider, and an image of one surface is reflected from the other surface more significantly. So, effect of the present invention becomes remarkable. The angle θ between the display surfaces 1a and 2a is 90 degrees in this case; however, the angle is not limited to the above case.

Figure 3:
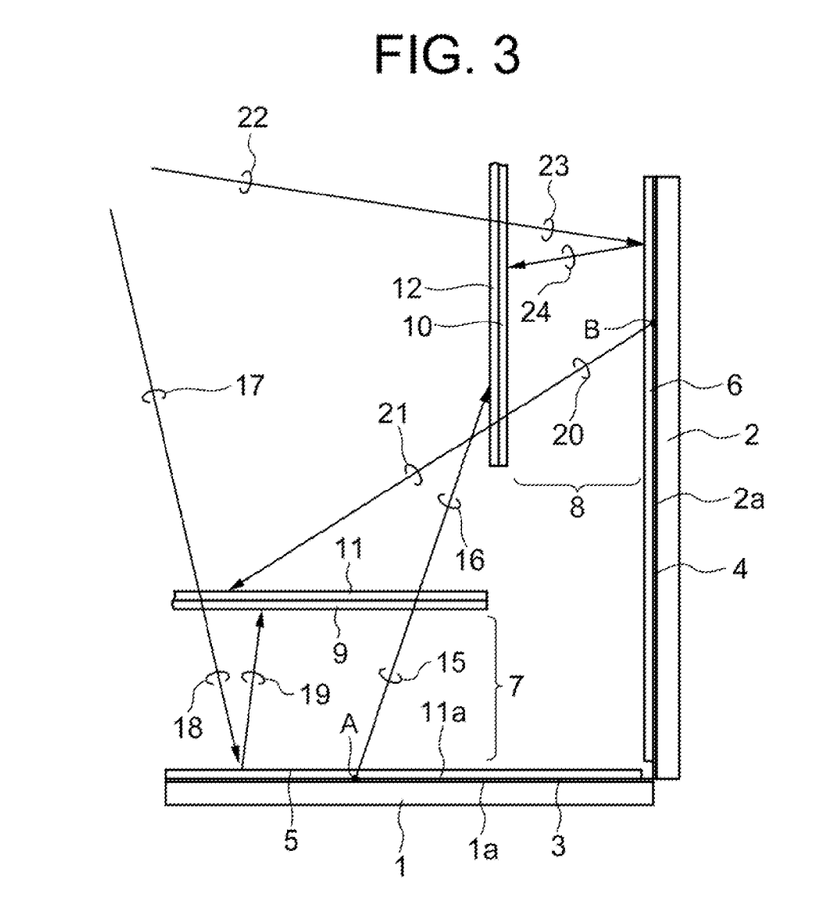
FIG. 3 a configuration diagram explaining motion of the image display device shown in FIG. 2.

FIG. 3 is a configuration diagram showing motion of the image display device in FIG. 2. In FIG. 3, the hollow layers 7 and 8 are shown in an enlarged size comparing to a normal size so that the principle can be easily understood.

The display surfaces 1a and 2a of the image display elements 1 and 2 are provided with the polarizing plates 3 and 4 respectively, and polarization directions of the polarizing plates 3 and 4 are set to be orthogonal to each other. In an example shown in FIG. 3, a horizontal polarization being a horizontal component of a linear polarization is outputted from the display surface 1a of the image display element 1 because there is the polarizing plate 3. A vertical polarization being a vertical component of the linear polarization is outputted from the display surface 2a of the image display element 2 because there is the polarizing plate 4.

In FIG. 2, a commonly-used LCD, such as a TN LCD and an STN LCD, is used as the image display elements 1 and 2. Therefore, when an image is displayed using the polarizing plates 3 and 4 in principle, a horizontal or a vertical polarization is emitted.

A light beam (a horizontal polarization) directed from a pixel A of the display surface 1a to the display surface 2a is converted into a right circular polarization 15 by the quarter wavelength plate 5, and then it is converted by the quarter wavelength plate 9 into a vertical polarization 16 which can be transmitted through the polarizing plate 11. The vertical polarization 16 transmitted through the polarizing plate 11 reaches the polarizing plate 12 arranged on a top face of a display surface 2a. In that case, the polarizing plate 12 is arranged so that a polarization direction of polarization transmitted therethrough is orthogonal to one for the polarizing plate 11. Therefore, the vertical polarization 16 can be absorbed. Thus, a light beam emitted from the display surface 1a can be diminished using the polarizing plate 12 on the top face of the display surface 2a, and thereby light reflected from the display surface 2a can be suppressed.

Further, in this structure, outside light 17 (including scattering light caused by the anti-glare processing of the polarizing plates 11 and 12) is transmitted through the polarizing plate 11 and the quarter wavelength plate 9 to become a right circular polarization 18. The right circular polarization 18 is reflected from a surface of the quarter wavelength plate 5 to become a left circular polarization 19, the left circular polarization 19 is transmitted through the quarter wavelength plate 9 to be converted into a horizontal polarization, and then the horizontal polarization is absorbed by the polarizing plate 11.

Furthermore, a light beam (a vertical polarization) directed from a pixel B of the display surface 2a to the display surface 1a is converted into a left circular polarization 20 by the quarter wavelength plate 6, then converted by the quarter wavelength plate 10 into a horizontal polarization 21 which can be transmitted through the polarizing plate 12. The horizontal polarization 21 transmitted through the polarizing plate 12 reaches the polarizing plate 11 arranged on the top face of the display surface 1a. In that case, the polarizing plate 11 is arranged so that a polarization direction of polarization transmitted therethrough is orthogonal to one for the polarizing plate 12. Therefore, the polarizing plate 11 can absorb the horizontal polarization 21. Thus, light emitted from the display surface 2a is diminished using the polarizing plate 11 on the top face of the display surface 1a, and light reflected from the display surface 1a can be suppressed.

Also, in this structure, outside light 22 (including a scattering light caused by the anti-glare processing of the polarizing plates 11 and 12) is transmitted through the polarizing plate 12 and the quarter wavelength plate 10 to become a left circular polarization 23. The left circular polarization 23 is reflected from the surface of the quarter wavelength plate 6 to become a right circular polarization 24, the polarization 24 is transmitted through the quarter wavelength plate 10 to be converted into a vertical polarization, and then the vertical polarization is absorbed by the polarizing plate 12.

According to the aforementioned principle, reflection images among the display surfaces 1a and 2a and reflection of the outside lights 17 and 22 can be prevented on the display surfaces 1a and 2a.

Next, an example will be explained as a second exemplary embodiment with reference to FIG. 4, in which an stereoscopic image is displayed using the image display device according to the first exemplary embodiment of the invention.

Figure 4:
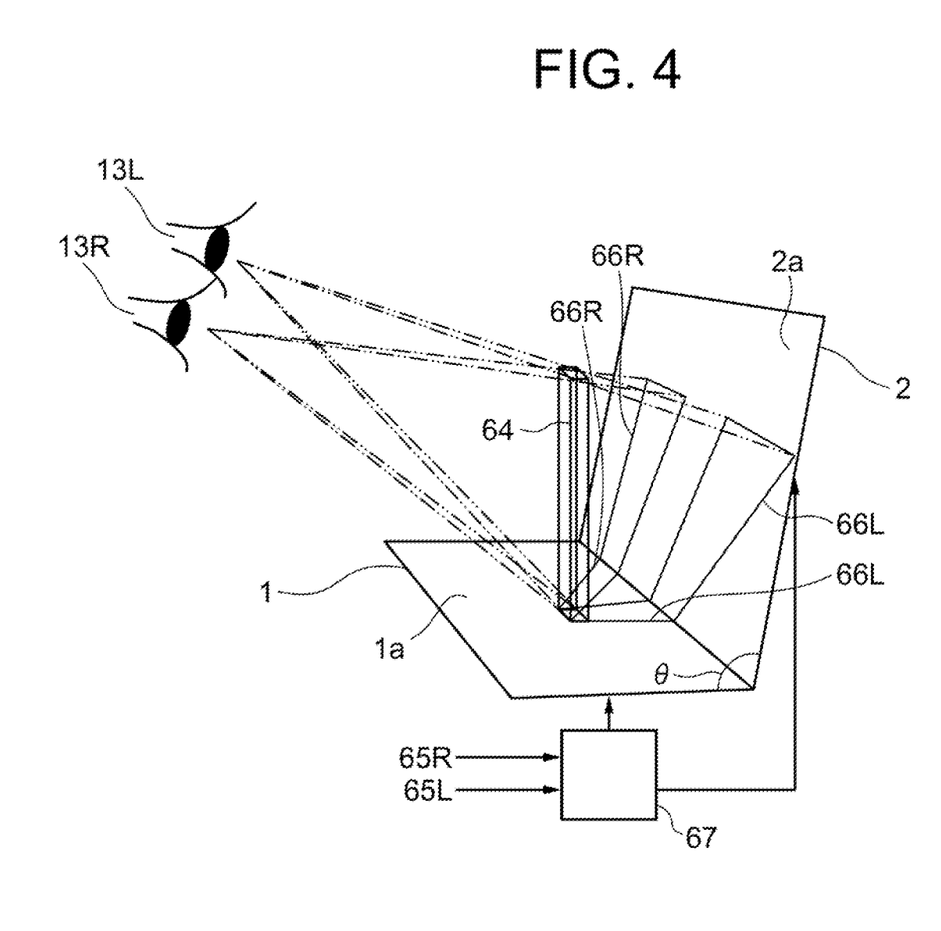
FIG. 4 a configuration diagram showing an image display device according to a second exemplary embodiment of the invention.

As shown in FIG. 4, the image display elements 1 and 2 according to the second exemplary embodiment of the invention include an image processing circuit 67, which allows parallax images for the viewpoint 13 to be spatially separated and displayed as a stereoscopic image on the display surfaces 1a and 2a. The image processing circuit 67 transforms a right eye viewpoint image signal 65R and a left eye viewpoint image signal 65L so as to generate a right eye perspective projection image 66R and a left eye perspective projection image 66L, and outputs data of the images 66R and 66L to the image display elements 1 and 2 respectively. Operation of the image processing circuit 67 enables an observer at the viewpoint 13 to be presented with a geometrically valid stereoscopic image 64 as an animated image in real-time. The image processing circuit 67 makes a closer object displayed as an image having bigger difference in binocular parallax. The image processing circuit 67 is a common circuit for the stereoscopic image display known by those skilled in the art, and an explanation therefor will be omitted. In addition, the polarizing plates 3 and 4, the first polarizing plates 5 and 6, the hollow layers 7 and 8, the second polarizing plates 9 and 10, and the polarizing plates 11 and 12, all of which are arranged on the display surfaces 1a and 2a in FIG. 3, are omitted respectively.

The display surfaces 1a and 2a of the image display elements 1 and 2 are combined at each end having an angle θ therebetween of, for example, 90 degrees. The image display elements 1 and 2 are liquid crystal panels, and those display surfaces 1a and 2a have lenticular lenses (unillustrated) attached thereto as an optical system for displaying a stereoscopic image. Further, the polarizing plates 3 and 4 are arranged on the lenticular lenses. It is designed so that the polarizing plates 3 and 4 allow the image display element 1 to emit a horizontal polarization and the image display element 2 to emit a vertical polarization respectively.

For the image display elements 1 and 2 in the second exemplary embodiment of the invention, color liquid crystal panels having 640 horizontal pixels by 480 vertical pixels, and 32 mm horizontal by 50 mm vertical in screen sizes were used. The display surfaces 1a and 2a of the image display elements 1 and 2 were provided with 320 lenticular lenses having a lens pitch of 100 μm. A distance for observation between the viewpoint 13 and the stereoscopic image display element 1 and 2 was 400 mm, and angle of view (referred to 14 in FIG. 2) was set at 10 degrees. The hollow layers 7 and 8 (FIGS. 2 and 3) were air layers having 100 μm thicknesses. Under the above condition, when displaying the images corresponding to respective viewpoints of a right eye 13R and a left eye 13L of the observer at the viewpoint 13, at an observing angle of 45 degrees on the display surfaces 1a and 2a optically and independently, the stereoscopic vision with naked eyes was achieved without special glasses and the like.

Further, because of functions of the polarizing plates 3 and 4, the quarter wavelength plates 5, 6, 9, and 10 (in FIGS. 2 and 3), and the polarizing plates 11 and 12, all of which were arranged in the image display elements 1 and 2, the observer obtained the stereoscopic vision without perceiving a false stereoscopic image caused by a reflection image among two display surfaces 1a and 2a. Furthermore, reflected light caused by outside light and scattering light caused by the anti-glare processing applied on the surfaces of the polarizing plates 11 and 12 (FIGS. 2 and 3) were suppressed.

When an image was displayed on the display surfaces 1a and 2a using the above mentioned image display device, a stereoscopic image without a false stereoscopic image caused by a reflection image was presented to the observer, and a stereoscopic display device presenting a realistic image with high level of visibility was provided.

A stereoscopic image is obviously a virtual image. A reflection image is also a virtual image. Therefore, the reflection image is easily mistaken for the stereoscopic image. Display of a stereoscopic image is affected more adversely than display of a plane image is by the reflection image. Thus, the present invention has a greater effect.

Figure 5:
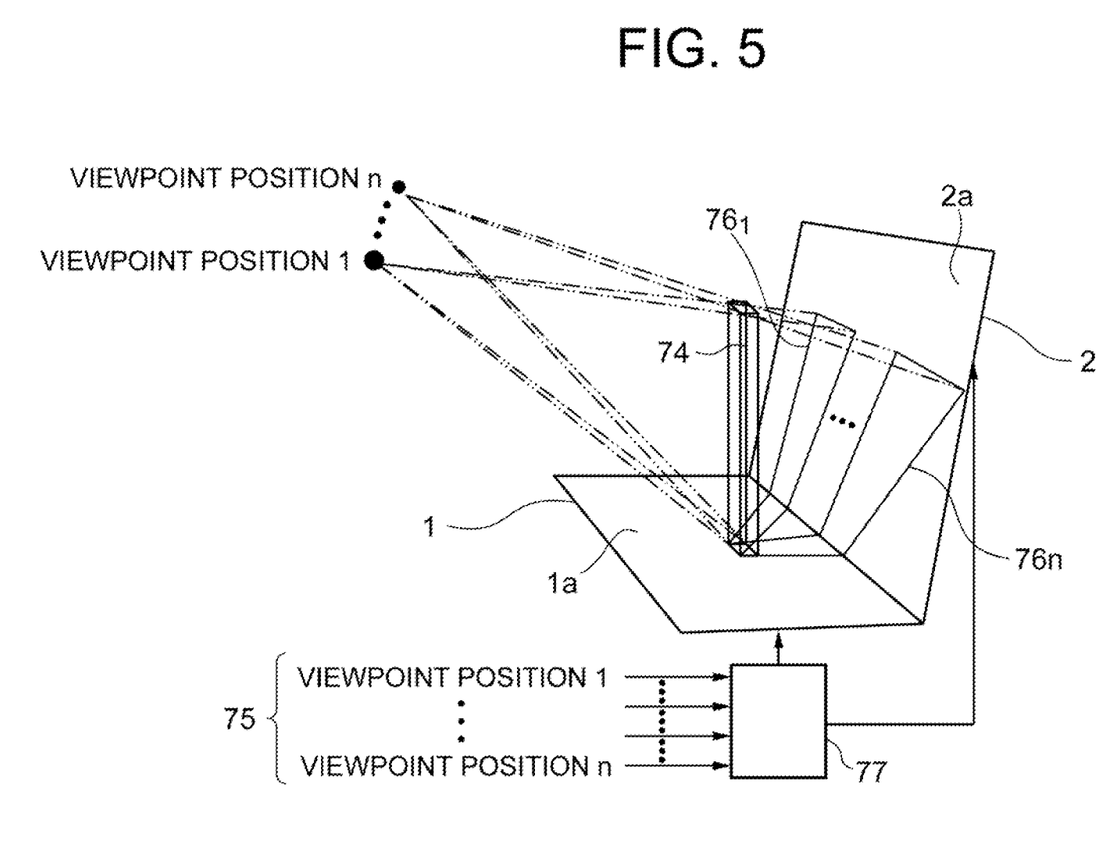
FIG. 5 a configuration diagram showing an image display device according to a third exemplary embodiment of the invention.

Next, an example will be explained with reference to FIG. 5 as a third exemplary embodiment, in which an image in a parallax image direction corresponding to at least two viewpoints is transformed and projected into an image corresponding to a positional relationship of each image display element.

The image display device according to the third exemplary embodiment is the image display device of the first exemplary embodiment (FIGS. 2 and 3) made to be capable of a multi-viewpoint image display for displaying a stereoscopic image at n viewpoints. For the image display elements 1 and 2, the same color liquid crystal panels as the second exemplary embodiment were used. The lens pitch of the lenticular lenses (unillustrated) was 50*n μm, and the number of the lenses was 640/n. For example, in a case with viewpoint number=4, the lens pitch is 200 μm, and the number of lenses are 160. The observation distance was set to be 400 mm, and the angle of view to be 10 degrees. The hollow layers 7 and 8 (FIGS. 2 and 3) were air layers with 100 μm thicknesses. Under this condition, when the images corresponding to respective viewpoints from a viewpoint position 1 to a viewpoint position n are displayed on the display surfaces 1a and 2a optically and independently at the observation angle of 45 degrees, the stereoscopic view with naked eyes can be achieved without wearing special glasses and the like. Further, because of functions of the polarizing plates 3, 4, 11, and 12 (FIGS. 2 and 3) and the quarter wavelength plates 5, 6, 9, and 10 (FIGS. 2 and 3) arranged in the image display elements 1 and 2, an observer obtained the stereoscopic view without perceiving a false stereoscopic image caused by a reflection image among two display surfaces 1a and 2a. Furthermore, reflected light caused by outside light and scattering light caused by anti-glare processing applied on the surfaces of the polarizing plates 11 and 12 (FIGS. 2 and 3) were suppressed.

Further, in the third exemplary embodiment, the image display elements 1 and 2 include an image processing circuit 77. The image processing circuit 77 transforms a multi-viewpoint image signal 75 at the viewpoint positions 1 to n so as to generate images ranging from a perspective projection transformation image $76_1$ at a viewpoint position 1 to a perspective projection transformation image $76_n$ at a viewpoint position n, and can present a geometrically valid stereoscopic image 74 as an animated image to the observer in real-time.

When an image was displayed on the display surfaces 1a and 2a using the above mentioned image display device, the observer was presented with a stereoscopic image without a false stereoscopic image caused by a reflection image. Therefore, a stereoscopic display device presenting a realistic image with high level of visibility was provided.

According to the above description, the device has a structure in which a light beam from the image display element 1 is converted into a horizontal polarization, and a light beam from the image display element 2 is converted into a vertical polarization. Now, another example will be explained as a fourth exemplary embodiment with reference to FIG. 6, in which a horizontal polarization and a vertical polarization are outputted even if two or more image display elements in the same polarization system are used.

Figure 6:
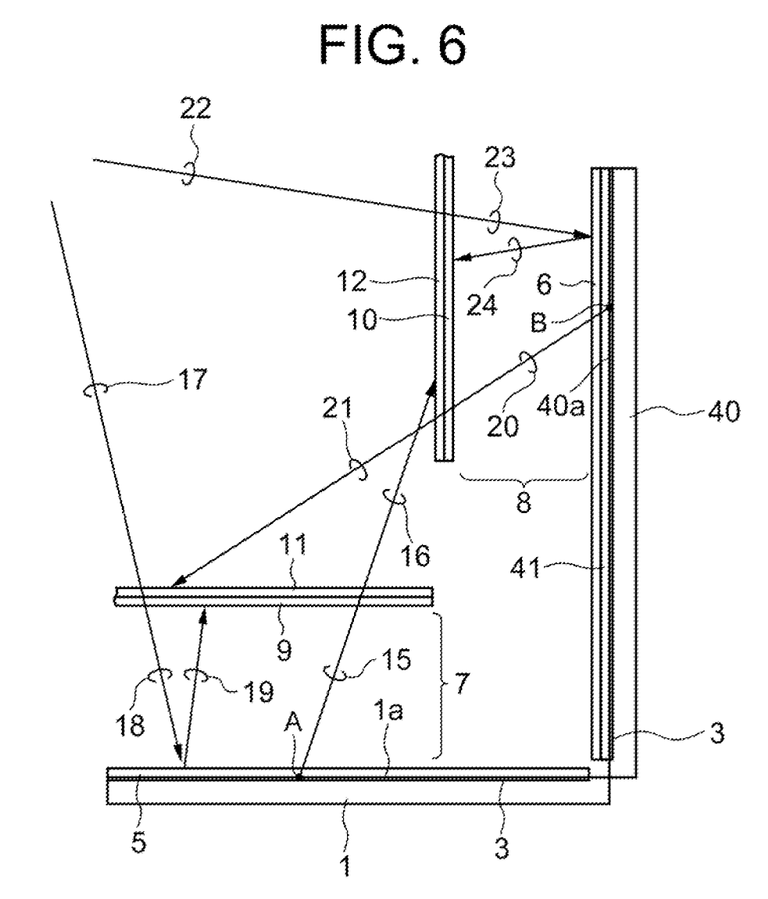
FIG. 6 a configuration diagram showing an image display device according to a fourth exemplary embodiment of the invention.

In FIG. 6, image display elements 1 and 40 employ for example a liquid crystal display in the same polarization system. Specifically, surfaces of the image display elements 1 and 40 are provided with lenticular lenses, and sealed with the polarizing plates 3 in the same polarization direction. Therefore, those two image display elements 1 and 40 output horizontal polarizations respectively. In the fourth exemplary embodiment, those two image display elements 1 and 40 are combined at the angle of 90 degrees.

In the fourth exemplary embodiment as shown in FIG. 6, a half wavelength plate 41 is attached to a front of one image display element 40, so that the image display element 40 outputs a vertical polarization through the half wavelength plate 41.

FIG. 6 is a configuration diagram showing operation of the image display device in the fourth exemplary embodiment. In FIG. 6, the hollow layers 7 and 8 are enlarged, comparing to a normal size, so that the principle is easily understood.

According to an example in FIG. 6, the display surface 1a of the image display element 1 outputs a horizontal polarization being a horizontal component of a linear polarization, and the display surface 40a of the image display element 40 outputs a vertical polarization being a vertical component of the linear polarization, because of existence of the half wavelength plates 41.

A light beam (a horizontal polarization) directed from a pixel of the display surface 1a to the display surface 40a is converted by the quarter wavelength plate 5 into a right circular polarization 15, and then converted by the quarter wavelength plate 9 into a vertical polarization 16 which can be transmitted through the polarizing plate 11. The vertical polarization 16 transmitted through the polarizing plate 11 reaches the polarizing plate 12 arranged on a top surface of the display surface 40a. In the above, the polarizing plate 12 is arranged so that a polarization direction of polarization transmitted therethrough is orthogonal to one for the polarizing plate 11, and the plate 12 can absorb the vertical polarization 16. Therefore, light emitted from the display surface 1a is diminished at the polarizing plate 12 on the display surface 40a, and reflected light from the display surface 40a can be suppressed.

Further, in this structure, outside light 17 (including scattering light caused by the anti-glare processing of the polarizing plates 11 and 12) is transmitted through the polarizing plate 11 and the quarter wavelength plate 9 to become a right circular polarization 18. The right circular polarization 18 is reflected from a surface of the quarter wavelength plate 5 to become a left circular polarization 19, and then is transmitted through the quarter wavelength plate 9 to be converted into a horizontal polarization which is absorbed by the polarizing plate 11.

Furthermore, a light beam (a vertical polarization) directed from a pixel on the display surface 40a to the display surface 1a is converted into a left circular polarization 20 by the quarter wavelength plate 6, and then is converted by the quarter wavelength plate 10 into a horizontal polarization 21 capable of being transmitted through the polarizing plate 12. The horizontal polarization 21 transmitted through the polarizing plate 12 reaches the polarizing plate 11 arranged on the top surface of the display surface 1a. In the above case, the polarizing plate 11 is arranged so that a polarization direction of polarization transmitted therethrough is orthogonal to one for the polarizing plate 12, and the plate 11 can absorbed the horizontal polarization 21. Therefore, light omitted from the display surface 40a is diminished at the polarizing plate 11 on the top surface of the display surface 1a, and reflected light from the display surface 1a can be suppressed.

Further, in this structure, outside light 22 (including scattering light caused by the anti-glare processing of the polarizing plates 11 and 12) is transmitted through the polarizing plate 12 and the quarter wavelength plate 10 to become a left circular polarization 23. The left circular polarization 23 is reflected from a surface of the quarter wavelength plate 6 to become a right circular polarization 24, and then is transmitted through the quarter wavelength plate 10 to be converted into a vertical polarization which is absorbed by the polarizing plate 12.

According to the above described principle, the reflection images among the display surfaces and reflection light of the outside light 17 and 22 can be prevented on the display surfaces 1a and 40a.

In the first to fourth exemplary embodiments described above, the image display elements in a certain system are used in which parallax images with respect to an origin are spatially separated to be displayed on the display surfaces. However, the image display elements are not limited to the above cases. The image display elements may display a two-dimensional image on the combination of display surfaces of the image display elements.

The image display elements can employ liquid crystal panels, organic EL panels, plasma display panels, surface-conduction electron-emitter displays, or other flat display panels, however, it can also employ CRTs other than the panels, or panels with large number of pixels and large screen sizes. The image display elements are attached with polarizing films as necessary.

Further, an angle between the neighboring two image display elements may be 90 degrees or wider, and the combination of image display elements may be two or more. The optical system which is a part of the image display device may be a parallax barrier, a lens array for integral photography, or a pinhole array, instead of the lenticular lens. The hollow layer is not necessary if outside light can be reflected from a surface of the quarter wavelength plate in a display surface side. In addition, the hollow layer may be set in a different thickness, or may be filled with resin or the like instead of air.

The present invention has been explained in the above with reference to embodiments (and examples), however, the present invention is not limited to the aforementioned embodiments (and examples). A structure and details in the present invention can be varied within a scope of the invention as long as those skilled in the art can understand it.

REFERENCE NUMERALS 1, 2, 40 IMAGE DISPLAY ELEMENT
1a, 2a, 40a DISPLAY SURFACE
3, 4, 11, 12, 30, 31 POLARIZING PLATE
5, 6, 9, 10 QUARTER WAVELENGTH PLATE
7, 8 HOLLOW LAYER
67, 77 IMAGE PROCESSING CIRCUIT

What is claimed is:

1. An image display device comprising: at least a first image display element and a second image display element,
  wherein each of a right eye image and a left eye image, generated by spatially separating a parallax image for a viewpoint, is displayed on a respective display surface of a corresponding one of the first image display element and the second image display element,
  wherein each display surface has a laminated structure comprising: a first quarter wavelength plate, a hollow layer, a second quarter wavelength plate, and a polarizing plate,
  wherein the first quarter wavelength plate converts light having a linear polarization into light having a circular polarization; the second quarter wavelength plate converts light having a circular polarization into light having a linear polarization; and the polarizing plate of the display surface of the first display element has a polarization direction that is orthogonal to a polarization direction of the polarizing plate of the display surface of the second display element,
  wherein light that is received from an outside and directed from the display surface of the first display element to the display surface of the second display element is absorbed by the laminated structures of the first display element and the second display element, and
  wherein the display surface of the first display element and the display surface of the second display element are configured to cause the right eye image to be observable by a naked right eye of an observer via a direct line of sight and to cause the left eye image to be observable by a naked left eye of the observer via a direct line of sight such that a synthesis of the right eye image and the left eye image is observable by the naked right and left eyes of the observer as a single image.

2. The image display device, as claimed in claim 1, wherein each of the first image display element and the second image display element comprises a processing unit for displaying a stereoscopic image the display surface thereof by spatially separating a parallax image with respect to a viewpoint.

3. The image display device, as claimed in claim 1, wherein the processing unit is configured to transform an image corresponding to at least two viewpoints into an image corresponding to a positional relationship between respective image display elements to project it.

4. The image display device, as claimed in claim 1, wherein each of the image display element and the second image display element comprises a processing unit for displaying a two-dimensional image on each display surface.

5. The image display device, as claimed in claim 1, wherein the first image display element and the second image display element are in a same polarization system, and a half wavelength plate is arranged on a front of one of the first image display element and the second image display element.

6. An image display means comprising: at least a first image display element and a second image display element,
   wherein each of a right eye image and a left eye image, generated by spatially separating a parallax image for a viewpoint, is displayed on a respective display surface of a corresponding one of the first image display element and the second image display element,
   wherein each display surface has a laminated structure comprising: a first quarter wavelength plate, a hollow layer, a second quarter wavelength plate, and a polarizing plate,
   wherein the first quarter wavelength plate converts light having a linear polarization into light having a circular polarization, and the second quarter wavelength plate converts light having a circular polarization into light having a linear polarization; and the polarizing plate of the display surface of the first display element has a polarization direction that is orthogonal to a polarization direction of the polarizing plate of the display surface of the second display element,
   wherein light that is received from an outside and directed from the display surface of the first display element to the display surface of the second display element is absorbed by the laminated structures of the first display element and the second display element, and
   wherein the display surface of the first display element and the display surface of the second display element are configured to cause the right eye image to be observable by a naked right eye of an observer via a direct line of sight and to cause the left eye image to be observable by a naked left eye of the observer via a direct line of sight such that a synthesis of the right eye image and the left eye image is observable by the naked right and left eyes of the observer as a single image.

7. An image display method comprising:
   providing at least a first image display element and a second image display element, wherein each of a right eye image and a left eye image, generated by spatially separating a parallax image for a viewpoint, is displayed on a respective display surface of a corresponding one of the first image display element and the second image display element, each display surface having a laminated structure comprising a first quarter wavelength plate, a hollow layer, a second quarter wavelength plate, and a polarizing plate;
   converting light having a linear polarization into light having a circular polarization by the first quarter wavelength plate, and converting light having a circular polarization into light having a linear polarization by the second quarter wavelength plate, wherein the polarizing plate of the display surface of the first display element has a polarization direction that is orthogonal to a polarization direction of the polarizing plate of the display surface of the second display element, and
   absorbing light that is received from an outside and directed from the display surface of the first display element to the display surface of the second display element by the laminated structures of the first display element and the second display element,
   wherein the display surface of the first display element and the display surface of the second display element are configured to cause the right eye image to be observable by a naked right eye of an observer via a direct line of sight and to cause the left eye image to be observable by a naked left eye of the observer via a direct line of sight such that a synthesis of the right eye image and the left eye image is observable by the naked right and left eyes of the observer as a single image.

\* \* \* \* \*